March 4, 1969 G. F. MEYER 3,430,832
WELDING WIRE FEEDING MECHANISM FOR CONTINUOUS WELDING APPARATUS
Filed July 21, 1967
Sheet 1 of 4
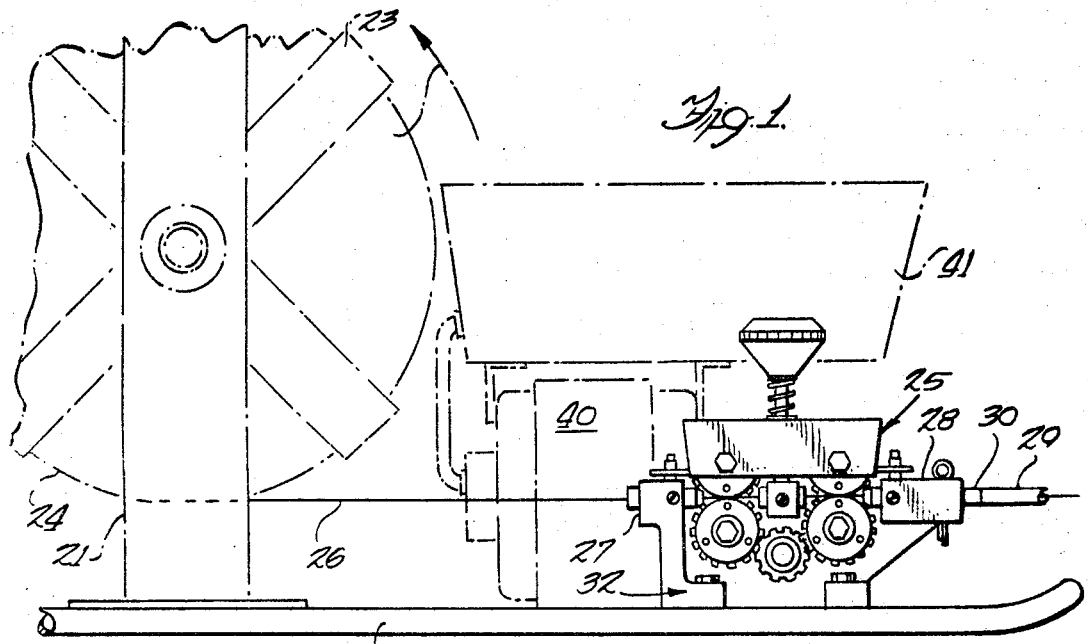
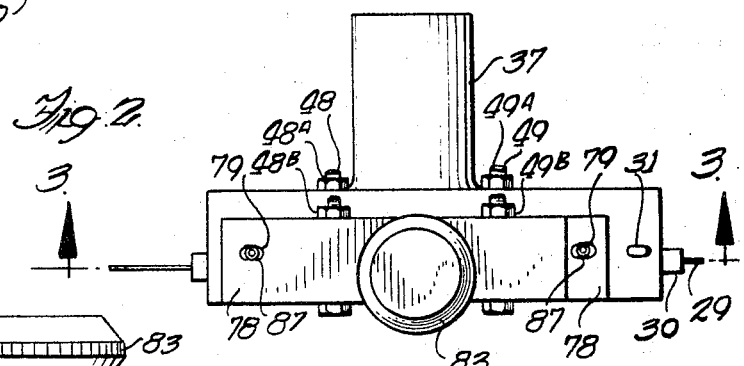
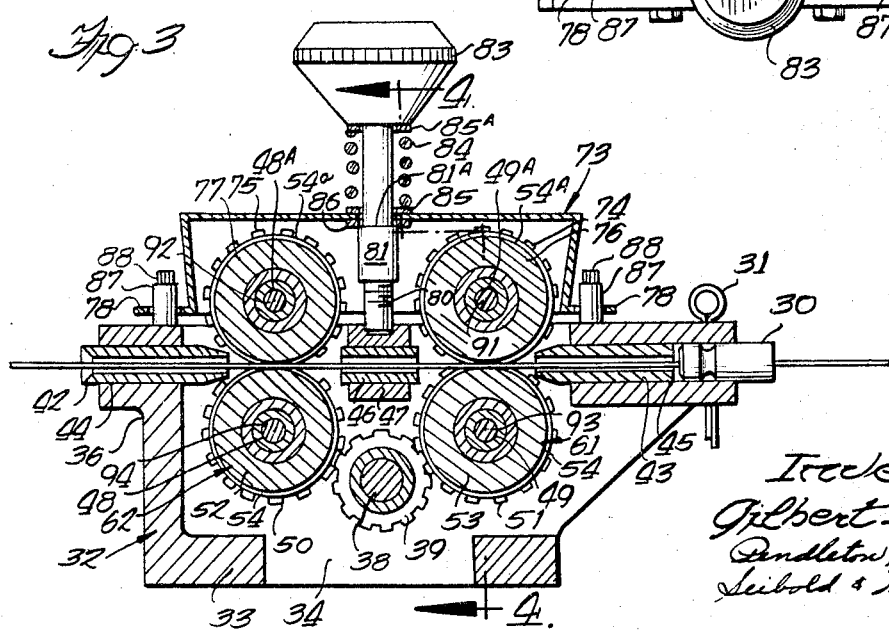
Inventor
Gilbert F. Meyer
Pendleton, Neuman
Seibold & Williams
Atty's

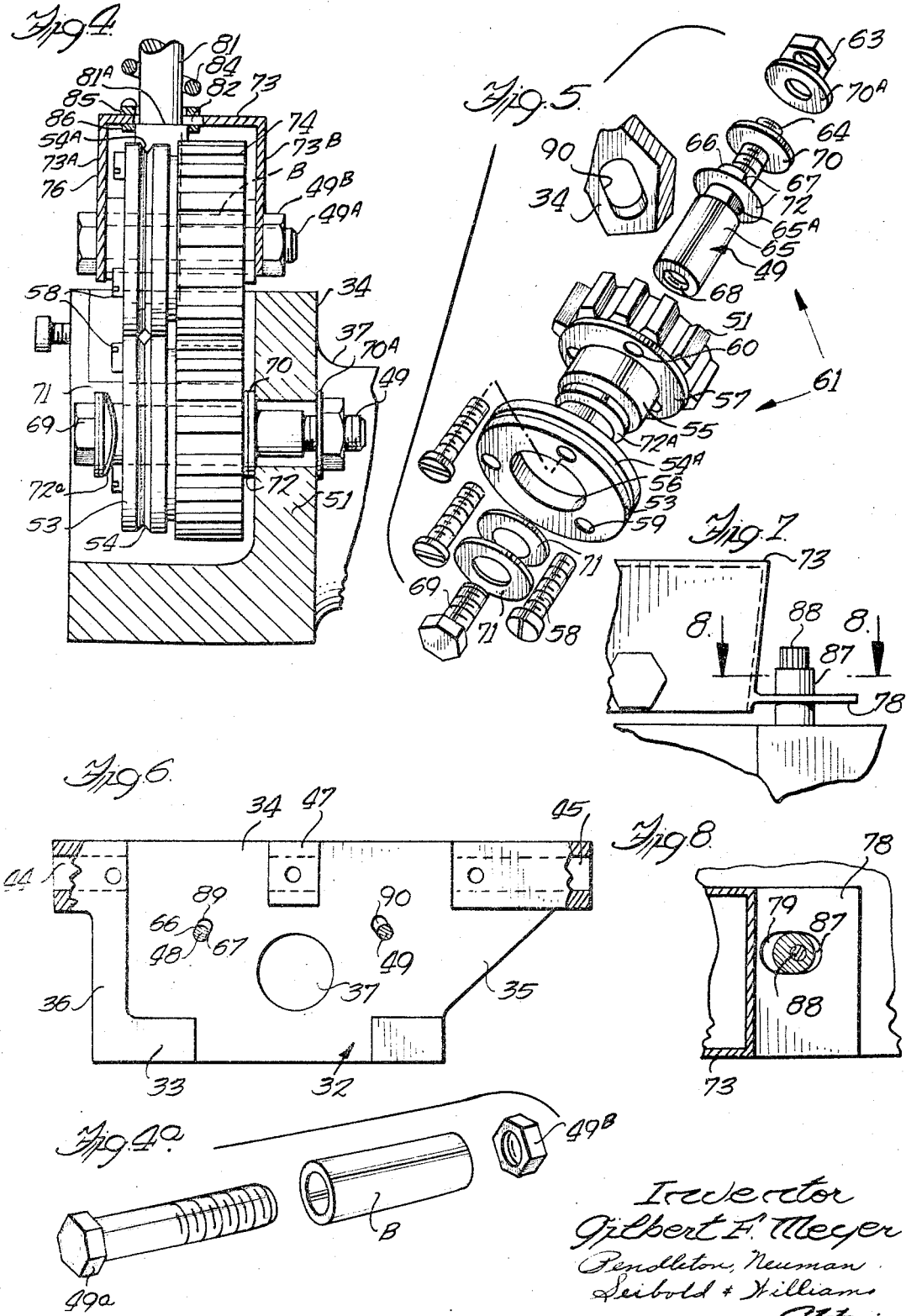

Inventor
Gilbert F. Meyer
Pendleton, Neuman
Seibold & Williams
Atty's

United States Patent Office 3,430,832
Patented Mar. 4, 1969

3,430,832
WELDING WIRE FEEDING MECHANISM FOR CONTINUOUS WELDING APPARATUS
Gilbert F. Meyer, Greendale, Wis., assignor to Machinery and Welder Manufacturing Corporation, Greendale, Wis., a corporation of Wisconsin
Filed July 21, 1967, Ser. No. 659,281
U.S. Cl. 226—174    17 Claims
Int. Cl. B65h 17/22, 17/20

ABSTRACT OF THE DISCLOSURE

A welding wire feeding mechanism for continuous welding apparatus providing for lateral and longitudinal alignment of feed rolls, the feed rolls being changeable, if necessary, without affecting the alignment.

Background of the invention

The field of the invention relates to an apparatus for feeding welding wire to a torch in an electric welding system used for continuous welding. It has been found that without proper alignment of the feed rolls the feeding of the wire could not be maintained at a suitable rate, and sometimes proper feeding could not be maintained at all.

In continuous welding operations welding wire is fed from a reel to a welding torch for many feet, for example, fifteen feet or more. The welding wire is fed through an insulated conduit or hose which consists of a spiral wire surrounded by insulation. With the welding wire traveling at such distances it is highly desirable to avoid the occurrence of kinks or bends which could result in the wire hanging or bunching up inside the insulated conduit, thereby causing delays in the operation.

Accurate dimensioning of the feed rolls is important, and highly accurate adjustability of the feed rolls longitudinally and laterally is an essential feature of the invention. The adjustability is necessary to take account of machining tolerances in manufacturing the various parts. The ability to feed welding wires of different diameters, whether hollow or solid, is a necessary attribute.

Summary of the invention

It is an object of the invention to provide an improved device for continuous feeding of welding wire to an electric welding torch in such a manner as to avoid bunching up of the welding wire in the feeding conduit during the operation of the electric welding apparatus.

A further object is to provide an improved welding wire feeding device of the character indicated which is simple in form, easy to adjust, and effective in operation.

Other objects and advantages will become apparent as the description proceeds.

By providing proper alignement of the feed rolls, any hanging or bunching up of the welding wire can be obviated. In carrying out the invention in one form, a drive mechanism is provided comprising a body member having a base, two upstanding side portions, and a rear portion, each of the side portions having apertures therethrough receiving guide members, a bearing housing in the rear portion, a drive shaft disposed in the bearing housing having a drive gear rotatably mounted on one end thereof, two elongated slotted holes in the rear portion adjacent the bearing housing and on opposite sides thereof, the slotted holes being substantially radially disposed relative to the center of the drive shaft, two lower shafts, one each of which is movably disposed in each of said slotted holes whereby longitudinal adjustment of each of said lower shafts is obtainable while maintaining the distance between the axis of the drive shaft and the axes of said lower shafts substantially the same, the lower shafts having lower gears rotatably mounted thereon and in meshing engagement with the drive gear, lower feed rolls rigidly secured to said gears, means on at least one of the lower shafts for lateral adjustment of the attached lower feed roll, the lower feed rolls having peripheral grooves to receive such welding wire, casing means movably mounted on the body member, two upper gears and two feed rolls supported in said casing means, one each of said feed rolls being attached to one each of the upper gears, the upper feed rolls having peripheral grooves to receive such welding wire, the upper gears being in meshing engagement with the lower gears, and pressure adjusting means mounted on the body member and engaging the casing means for urging the upper feed rolls toward the lower feed rolls and for contacting any welding wire when fed by the feed rolls.

Brief description of the drawings

FIGURE 1 is an elevational view of welding apparatus including a drive mechanism embodying the invention;

FIG. 2 is a top view on a larger scale of the drive mechanism shown in FIG. 1;

FIG. 3 is a sectional view taken along line 3—3 of FIG. 2;

FIG. 4 is a sectional view taken along line 4—4 of FIG. 3;

FIG. 4A is an exploded perspective view of certain components of the drive mechanism;

FIG. 5 is an exploded perspective view of certain other operative components of the drive mechanism;

FIG. 6 is a front view partially in section of another component of the drive mechanism;

FIG. 7 is an enlarged fragmentary view of one adjusting mechanism according to the invention;

FIG. 8 is a sectional view taken along line 8—8 of FIG. 7;

Description of preferred embodiments

Figure 12:
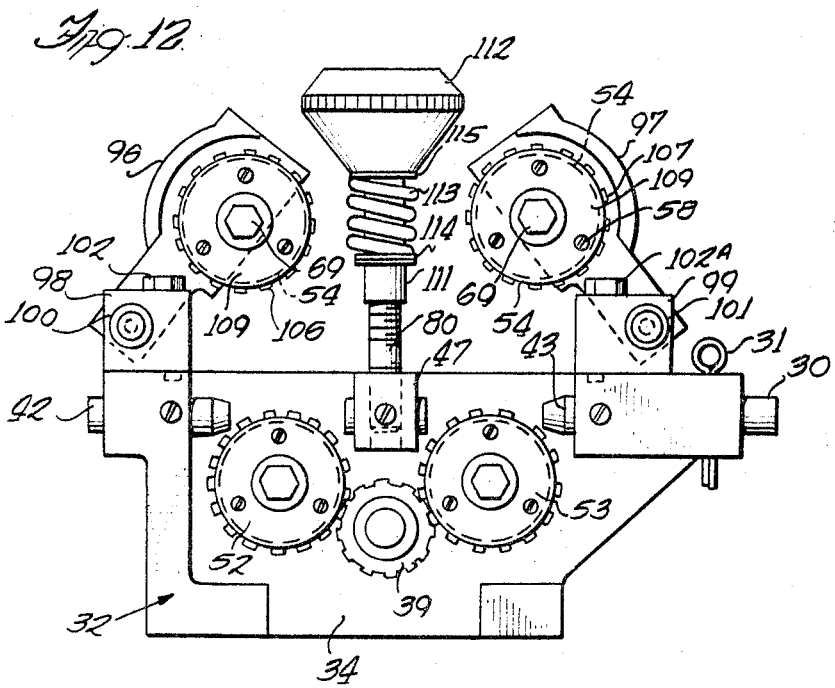
FIG. 12 is an elevational view on a larger scale of the drive mechanism shown in FIG. 9 with certain components in an open position.
Figure 13:
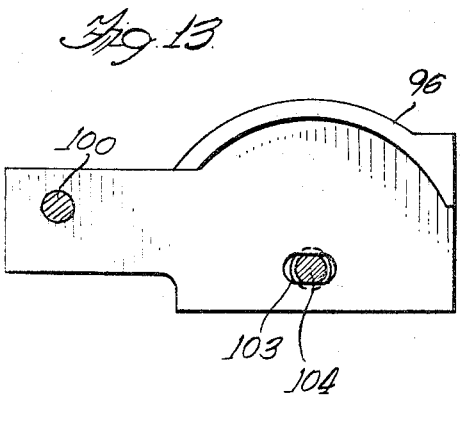
FIG. 13 is a view on a larger scale of one component of the drive mechanism shown in FIG. 9.

Referring more particularly to the drawings, a basic welding assembly is shown in FIG. 1 and comprises a framework 20, an upright 21 supported thereby, a reel 23 containing welding wire 24 supported on the upright, and a drive mechanism 25 according to the invention.

Figure 11:
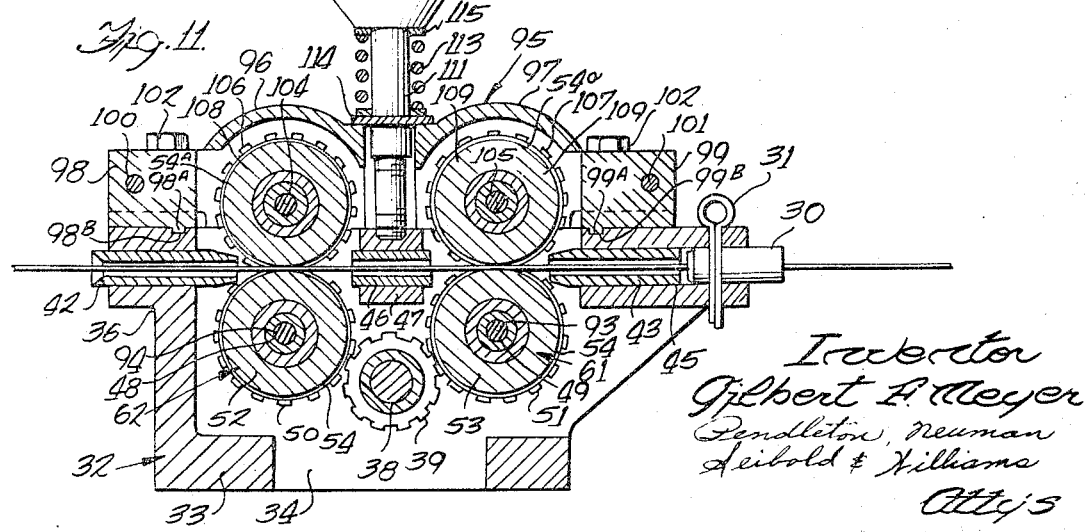
FIG. 11 is a sectional view taken along line 11—11 of FIG. 10.

The lead portion 26 of the welding wire, as shown in FIG. 1, enters the drive mechanism at inlet 27 and exits at outlet 28. As the wire exits, it passes through a flexible wire conduit 29 and from there to a torch (not shown). The flexible wire conduit 29 is terminated by an insulator 30 which is slidably received in the side portion of the body member. A cotter pin 31 passes through a semicircular slot in insulator 30 thereby holding it in place as shown in FIGS. 3 and 11. Other features of the welding assembly are shown in the applications of the same inventor Ser. No. 494,486, filed Oct. 11, 1965, entitled, "Improvement in Electric Welding Assembly," and Ser. No. 494,489, filed Oct. 11, 1965, entitled, "Improvement in Electric Welding Apparatus for Continuous Welding,"

the subject invention residing in an improved drive mechanism.

The drive mechanism, generally indicated by the numeral 25 is more clearly shown in FIG. 3 and includes a body member 32 having a base portion 33, an upstanding rear portion 34, and two side portions 35 and 36, respectively, as shown in FIGS. 1, 3, and 6. The rear portion includes a bearing housing 37 which slidably receives a drive shaft 38 with a gear 39 mounted on one end thereof. The drive shaft 38 is connected in any suitable manner to a motor 40, and the speed of the motor is maintained constant by a control unit 41. Guide members 42 and 43 are disposed in apertures 44 and 45, respectively, at the ends of the side portions 36 and 35, respectively, of the body member 32, and an intermediate guide member 46 is disposed in an aperture in a lug 47 which extends outwardly from the rear portion 34. The guide members 42, 43 and 46 are arranged in substantially a straight line and include openings therein of such size that wire 24 can pass easily therethrough.

Also extending through the rear portion 34 are shafts 48 and 49 (see FIG. 5). These shafts have lower gears 50 and 51, respectively, rotatably mounted thereon with feed rolls 52 and 53, respectively, secured to the gears. Each feed roll 52 and 53 has a peripheral triangular groove 54 which accepts the wire 24 as it passes through the drive mechanism. Other shapes of grooves may be used. The feed rolls are manufactured within precise tolerance limits such that the roll dimensions are highly accurate. By designing the rolls to be accurate, the feeding of the wire can be accomplished more effectively. In addition, the roll groove width and depth are kept within precise limits which obviates slippage of the welding wire during the feeding operation.

All of the gears, with the exception of the drive gear, are provided with circular hubs 55 which are set within apertures 56 in the feed rolls (see FIGS. 4 and 5). The gears are provided with peripheral shoulders 57 of somewhat lesser diameter which form an abutment face for the rolls and prevent the rolls from contacting the teeth of the gears in the assembled mechanism. Any suitable means such as screws 58 passing through holes 59 in the rolls and into threaded holes 60 in the shoulders 57 of the gears may be used to fasten the roll to the gear. Once alignment of the rolls is set, different rolls may be employed merely by taking the roll off the gears and putting a new and accurate one in its place.

Two sets of lower gear and roll assemblies 61 and 62 are employed and are secured to the body member 32. Since both sets are identical, only one set will be described in detail. The gear and roll assembly 61, more clearly shown in FIG. 5, is attached to the body member 32 by an adjusting shaft 49 which extends through the gear 51, the roll 53 and the body member 32, the shaft being held in place by nut 63. The adjusting shaft 49 has an externally threaded portion 64 cooperating with nut 63, a circular bearing portion 65 terminating in a shoulder 65A, flat sides 66 and 67, and internal threads 68 adapted to receive bolt 69. Washer 70A is interposed between nut 63 and the outer portion of rear wall 34, and as shown in FIGS. 4 and 5, washer 70 bears against the inner portion of rear wall 34, and shoulder 65A bears against a shim 72 which in turn bears against washer 70. One or more washers 71 and bowed shim 72A are interposed between bolt 69 and shaft 49.

In the case where lateral adjustment of the lower roll 53 is necessary to line up the groove 54 therein with a groove 54A in the upper roll 76, shims 72 are provided. These shims are quite thin as compared with the thickness of the washers and are utilized to provide pinpoint accuracy in the alignment of the rolls. The number of shims employed is not critical and more than one may be used, if necessary. Since roll assembly 62 is identical to roll assembly 61, it will be understood that shaft 48 has a shoulder and two flat sides and functions the same way as roll assembly 61.

Turning to FIGS. 3 and 4, the casing or support 73 is shown housing a set of upper gears 74 and 75 and feed rolls 76 and 77 attached thereby by screws as described for the other rolls. Feed rolls 76 and 77 each include peripheral grooves similar to groove 54. Shafts 48A and 49A which may comprise bolts providing bearing surfaces for these gears and rolls are held in place by nuts 48B and 49B, respectively. Cylindrical bushings B surround each of the shafts 48A and 49A and act to prevent the sides 73A and 73B of the casing or support from contacting the upper rolls and gears (see FIG. 4A).

The casing 73 has outwardly extending flanges 78 with elongated slots 79 (see FIG. 2) for lateral adjustment purposes and the casing is held in position by a stud or bolt 80 and an internally threaded stem 81, stud 80 being secured in the lug 47 which is integral with the rear portion 34 of the body member. The stem 81 includes a shoulder 81A, extends through an elongated opening 82 (FIG. 4) in the casing and is rigidly attached to handle 83. A spring 84 is positioned between handle 83 and casing 73, and washers 85 and 85A are positioned, respectively, between the spring and the handle and between the spring and the casing. A washer 86 is interposed between the underside of the casing and the shoulder 81A for holding the stem and casing together. When handle 83 is turned in one direction, spring 84 exerts pressure on casing 73 which results in the upper rolls coming into contact with the lower rolls. Opposite turning of the handle would, of course, result in the opposite effect.

The teeth of the upper and lower gears engaging with each other permit sufficient relative gear movement upon turning of the handle 83 for the rolls to move for increasing or decreasing the size of the wire feeding groove formed by grooves 54 and 54A. Varying the size of the groove permits the passage of wires of different size or may provide more or less friction for any one size of wire.

The handle 83, stem 81, and spring 84 constitute a pressure adjusting means and act to exert equal pressure on the lower feed rolls. This equal pressure is necessary to assure a smooth feeding of the wire through the mechanism. By varying the pressure, different-sized wires may be readily fed through the drive mechanism. Hollow wires may be pulled through without significant deformation by reducing the pressure exerted by the pressure adjusting means on the lower feed rolls.

The casing and, of course, the upper feed rolls disposed therein may be laterally aligned with respect to the body member and the lower feed rolls by cam members 87 which are movably secured to the upstanding side portions 35 and 36 by screws 88 and are eccentric with respect thereto. Since an elongated opening 82 is present in the casing, the casing can move laterally as the cams 87 are turned (see FIGS. 7 and 8); that is to say, the elongated slot permits the casing to move forward and backward. Such an alignment means acts to align groove 54A in upper roll 76 with groove 54 in lower roll 53. Similarly, the groove 54 in roll 52 is aligned with groove 54A in upper roll 77. After any adjustment is made to line up the grooves 54 and 54A, the cam members 87 may be locked in place by screws 88.

The body member 32 (see FIGS. 5 and 6) has two elongated upwardly and inwardly inclined slotted holes 89 and 90 in the rear portion 34 disposed adjacent the bearing housing 37 for the drive shaft 38. Preferably, the slotted holes 89 and 90 are substantially radially disposed relative to the center of the drive shaft. By providing slotted holes on a substantially constant radius relative to the center of the drive shaft, longitudinal adjustment of each of the lower shafts is obtainable while maintaining the distance between the axis of the drive shaft and the axis of each lower shaft substantially the same. Should either lower roll need to be aligned longitudinally with respect to its companion upper roll, the appropriate shaft may simply be moved along the slotted hole to the desired position and clamped, as will be described. Such movement would prevent jamming of the lower gears 50 and 51 with the drive gear 39 and yet not result in a disengagement with the drive gear since the distance between the axis of the drive shaft and the axis of the lower shafts remain substantially the same.

The flat sides 66 and 67 of lower adjusting shaft 49 contact the sides of the slotted hole 90 as seen in FIGS. 5 and 6, and the distance between the sides is such as to allow the shaft to move easily in the slot. The shaft can not, however, rotate in the slot. The lower adjusting shaft 48 likewise has flat sides and can move radially and thus generally longitudinally in the slot 89 but can not rotate therein. After the rolls 53 and 76 are aligned, nut 63 secures the adjusting shaft 48 to the rear portion 34 of the body member. Similarly, adjusting shaft 49 may be secured to the rear portion after proper alignment has been effected.

In the final adjustment, the distance between the axes 91 and 92 of gears 74 and 75, respectively, (and of rolls 76 and 77, respectively) is the same as the distance between axes 93 and 94 of gears 50 and 51, respectively (and of rolls 52 and 53, respectively). Also, the distance between axes 92 and 94 of gears 75 and 50, respectively (and of rolls 77 and 52, respectively) is the same as the distance between axes 91 and 93 of gears 74 and 51, respectively, (and of rolls 76 and 53, respectively).

With the above adjustment effected, an imaginary line drawn between axes 92 and 94 would be perpendicular to an imaginary line drawn between the centers of guide members 42, 43 and 46. Similarly, an imaginary line drawn between the axes 91 and 93 would be perpendicular to the imaginary line between centers of guide members 42, 43 and 46. It has been found that where the above relationship exists, proper and efficient feeding of the wire can be accomplished.

A more precise means of accomplishing the adjustment of the upper feed rolls is disclosed in the alternative embodiment shown in FIGS. 9–14 which is more versatile than the first-disclosed embodiment in that a larger range of wires may be readily fed. The basic mechanism in the two embodiments is similar and like parts are referred to by like numerals. Thus, the lower rolls 52 and 53 of FIGS. 9–14 and their appurtenant parts are the same as for FIGS. 1–8.

Figure 14:
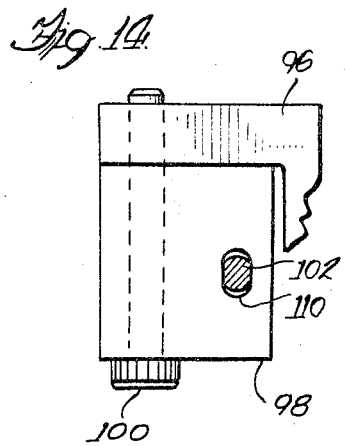
FIG. 14 is a fragmentary top view of other components of the drive mechanism shown in FIG. 9.
Figure 9:
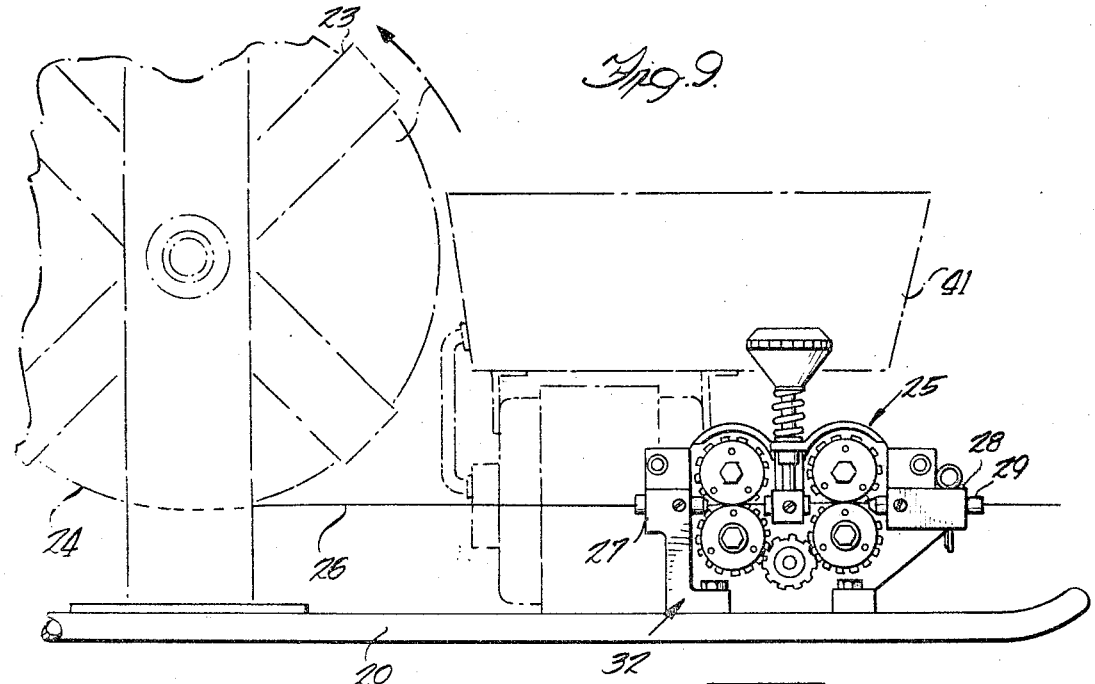
FIG. 9 is an elevational view of the welding apparatus including an alternative embodiment of a drive mechanism according to the invention.
Figure 10:
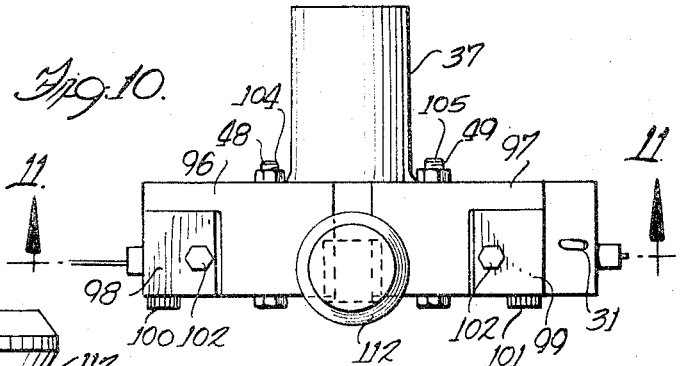
FIG. 10 is a top view on a larger scale of the drive mechanism shown in FIG. 9.

The structure 95 for supporting the upper gears and feed rolls consists of two supports 96 and 97 pivotally connected to hinge blocks 98 and 99, respectively, by threaded bolts 100 and 101, respectively (see FIG. 14). Hinge blocks 98 and 99 are, in turn, connected to upstanding side portions 36 and 35, respectively, by threaded bolts 102. To prevent longitudinal movement, but allow for lateral movement, of hinge blocks 98 and 99, tongues 98A and 99A, respectively, slidably cooperate with grooves 98B and 99B, respectively, in side portions 36 and 35, respectively.

An elongated slot 103 is provided in support 96 which allows for longitudinal movement of upper adjusting shaft 104. Similarly, an elongated slot is provided in support 95 for shaft 105. Adjusting shafts 104 and 105 are identical to shafts 48 and 49 and function in the same manner. It is thus understood that each shaft 104 and 105 has an externally threaded portion cooperating with a nut which holds the shaft in place, a circular bearing portion, two flat sides and internal threads to receive an attaching bolt 69. Upper gears 106 and 107 and corresponding feed rolls 108 and 109 are rotatably mounted on shafts 104 and 105, respectively, so that when the shafts are moved longitudinally the rolls also move longitudinally. Hence, the slots provide for longitudinal adjustability of the upper rolls with the companion lower rolls.

Each support 96 and 97 and the roll housed therein may be laterally adjusted so that grooves 54A of upper rolls 108 and 109 line up with grooves 54 of the companion lower rolls 52 and 53. Thus, moving hinge block 98 along groove 98B provides lateral adjustability. The extent of this movement is limited by elongated slot 110 (see FIG. 14) through which bolt 102 passes. Once alignment is effected, the hinge block 98 may be secured in place by bolt 102. Similarly, hinge block 99 may be laterally adjusted and secured in place by a bolt 102A.

Supports 96 and 97 are maintained in position by a pressure adjusting means which comprises an internally threaded stem 111 cooperating with stud 80 attached to lug 47 integral with rear portion 34. Attached to the upper portion of sleeve 111 is handle 112 with a spring 113 bearing thereagainst with a washer 115 therebetween. The lower part of spring 113 contacts a clamp plate 114 which clamp plate exerts a downward pressure on the supports 96 and 97. As in the first-disclosed embodiment, the pressure adjusting means exerts equal pressure on the lower feed rolls.

Referring to FIG. 11, it will be seen that proper adjustment of support 96 in the direction of wire movement (longitudinally) places the axis of shaft 104 directly above the center 94 of shaft 48, i.e., at right angles to the direction of wire movement. Kinking of the welding wire is thus avoided. Similarly, proper adjustment of shaft 105 places its axis directly above axis 93 of shaft 49 (at right angles to direction of wire movement).

It is thus seen that a drive mechanism has been provided which takes into account normal machining tolerances such that a proper alignment of the gears and feed rolls can be accomplished easily and effectively with relatively little mechanical manipulation. The improved device is capable of being used with various sizes of welding wire without necessitating a change in the rolls. If, however, a change in rolls is deemed necessary, such may be made without affecting the alignment merely by replacing the roll with a new roll.

While particular embodiments of the invention have been shown, it is to be understood that the invention is not limited thereto since many minor modifications may be made; and it is, therefore, contemplated by the appended claims to cover any such modifications as fall within the true spirit and scope of the invention.

The invention having thus been described, what is claimed and desired to be secured by Letters Patent is:

1. In an electric welding assembly, a drive mechanism for supplying welding wire to a welding area in a continuous length comprising a body member having a base, two upstanding side portions and a rear portion, each of said two side portions having apertures therethrough receiving wire guide members, a bearing housing in said rear portion, a drive shaft disposed in said bearing housing having a drive gear rotatably mounted on one end thereof, two elongated slotted holes in said rear portion adjacent said bearing housing and on opposite sides thereof, said slotted holes being substantially radially disposed relative to the center of said drive shaft, two lower shafts one each of which is movably disposed in each of said slotted holes whereby longitudinal adjustment of each of said lower shafts is obtainable while maintaining the distance between the axis of said drive shaft and the axes of said lower shafts substantially the same, said lower shafts having lower gears rotatably mounted thereon and in meshing engagement with said drive gear, lower feed rolls rigidly secured to said gears, said lower feed rolls having peripheral grooves to receive such welding wire, casing means movably mounted on said body member, two upper gears and two feed rolls supported in said casing means, one each of said feed rolls being attached to one each of said upper gears, said upper feed rolls having peripheral grooves to receive such welding wire, said upper gears being in meshing engagement with said lower gears, and pressure adjusting means mounted on said body member and engaging said casing means for urging said upper feed rolls toward said lower feed rolls and for contacting any welding wire when fed by said feed rolls.

2. The invention according to claim 1 characterized in that the distance between the axes of the upper and lower gears is the same, and the distance between the axes of the two upper gears is the same as the distance between the axes of the lower gears whereby a line extending between the axes of companion upper and lower gears is perpendicular to a line extending between the guide members in the body.

3. The invention according to claim 1 characterized in that the casing means includes two outwardly extending side flanges movably contacting the two side portions of the body.

4. The invention according to claim 3 characterized in that the flanges have elongated slots therethrough and the side portions have cams movably secured thereto and engaged within said slots for lateral adjustment of the casing means with respect to the body member whereby the grooves in the upper feed rolls may be laterally aligned with the grooves in the lower feed rolls.

5. The invention according to claim 1 characterized in that the casing means comprises two separate supports one each of which is pivotally mounted on each side portion of the body member, and each support includes one upper gear and one attached feed roll.

6. The invention according to claim 5 characterized in that each support includes a longitudinally disposed elongated slot, a shaft received within the said slot for longitudinal shaft positioning, said shaft having an upper gear and an attached feed roll rotatably mounted thereon whereby longitudinal adjustment of said shaft in said slot effects longitudinal alignment of the upper feed roll relative to the companion lower feed roll.

7. The invention according to claim 6 characterized in that a hinge block is mounted on each side portion and one each of said supports is pivotally connected to a respective one of said hinge blocks.

8. The invention according to claim 7 characterized in that each hinge block has an elongated laterally disposed slot, means disposed in said slot for laterally adjustably connecting the hinge block to the side portion whereby lateral adjustment of the hinge block with respect to the side portion effects lateral alignment of the grooves in the upper feed rolls relative to the grooves in the companion lower feed rolls.

9. In an electric welding assembly, a drive mechanism for supplying welding wire to a welding area in a continuous length comprising a body member having a base, two upstanding side portions and a rear portion, each of said two side portions having apertures therethrough receiving wire guide members, a bearing housing in said rear portion, a drive shaft disposed in said bearing housing having a drive gear rotatably mounted on one end thereof, two elongated slotted holes in said rear portion adjacent said bearing housing and on opposite sides thereof, said slotted holes being substantially radially disposed relative to the center of said drive shaft, two lower shafts one each of which is movably disposed in each of said slotted holes whereby longitudinal adjustment of each of said lower shafts is obtainable while maintaining the distance between the axis of said drive shaft and the axes of said lower shafts substantially the same, said lower shafts having lower gears rotatably mounted thereon and in meshing engagement with said drive gear, lower feeds rolls rigidly secured to said gears, means on at least one of said lower shafts for lateral adjustment of the attached lower feed roll, said lower feed rolls having peripheral grooves to receive such welding wire, casing means movably mounted on said body member, two upper gears and two feed rolls supported in said casing means, one each of said feed rolls being attached to one each of said upper gears, said upper feed rolls having peripheral grooves to receive such welding wire, said upper gears being in meshing engagement with said lower gears, and pressure adjusting means mounted on said body member and engaging said casing means for urging said upper feed rolls toward said lower feed rolls and for contacting any welding wire when fed by said feed rolls.

10. The invention according to claim 9 characterized in that the lateral adjusting means on the lower shaft comprises at least one shim mounted on the lower shaft.

11. The invention according to claim 9 characterized in that the distance between the axes of the upper and lower gears is the same, and the distance between the axes of the two upper gears is the same as the distance between the axes of the lower gears whereby a line extending between the axes of a set of upper and lower gears is perpendicular to a line extending between the guide members in the body.

12. The invention according to claim 9 characterized in that the casing means includes two outwardly extending side flanges contacting the two side portions of the body.

13. The invention according to claim 12 characterized in that the flanges have elongated slots therethrough and the side portions have cams movably secured thereto and engaged within said slots for lateral adjustment of the casing means with respect to the body member whereby the grooves in the upper feed rolls may be laterally aligned with the grooves in the lower feed rolls.

14. The invention according to claim 9 characterized in that the casing means comprises two separate supports one each of which is pivotally mounted on each side portion of the body member, and each support includes one upper gear and one attached feed roll.

15. The invention according to claim 14 characterized in that each support includes a longitudinally disposed elongated slot, a shaft received within the said slot for longitudinal shaft positioning, said shaft having an upper gear and an attached feed roll rotatably mounted thereon whereby longitudinal adjustment of said shaft in said slot effects longitudinal alignment of the upper feed roll relative to the companion lower feed roll.

16. The invention according to claim 15 characterized in that a hinge block is mounted on each side portion and one each of said supports is pivotally connected to a respective one of said hinge blocks.

17. The invention according to claim 16 characterized in that each hinge block has an elongated laterally disposed slot, a bolt disposed in said slot for laterally adjustably connecting the hinge block to the side portion whereby lateral adjustment of the hinge block with respect to the side portion effects lateral alignment of the grooves in the upper feed rolls relative to the rolls in the companion lower feed rolls.

References Cited

UNITED STATES PATENTS

| | | | |
|---|---|---|---|
| 2,032,260 | 2/1936 | Chapman | 226—177 X |
| 2,613,706 | 10/1952 | Smith | 226—177 X |
| 3,331,545 | 7/1967 | Olivieri | 226—187 |

ALLEN N. KNOWLES, *Primary Examiner.*

U.S. Cl. X.R.

226—177, 179, 180, 194

UNITED STATES PATENT OFFICE
CERTIFICATE OF CORRECTION

Patent No. 3,430,832

March 4, 1969

Gilbert F. Meyer

It is certified that error appears in the above identified patent and that said Letters Patent are hereby corrected as shown below:

Column 2, line 71, "494,489" should read -- 494,487 --. Column 7, line 62, "feeds" should read -- feed --.

Signed and sealed this 31st day of March 1970.

(SEAL)
Attest:

Edward M. Fletcher, Jr.

Attesting Officer

WILLIAM E. SCHUYLER, JR.

Commissioner of Patents